United States Patent

[11] 3,608,628

| | | |
|---|---|---|
| [72] | Inventor | Louis H. Leonard, Jr.<br>Dewitt, N.Y. |
| [21] | Appl. No. | 20,772 |
| [22] | Filed | Mar. 18, 1970 |
| [45] | Patented | Sept. 28, 1971 |
| [73] | Assignee | Carrier Corporation<br>Syracuse, N.Y. |

[54] HEATING AND COOLING SYSTEM
5 Claims, 5 Drawing Figs.

[52] U.S. Cl. ............................................ 165/62,
62/476, 165/63, 415/89
[51] Int. Cl. .......................................... F25b 13/00,
F25b 15/06
[50] Field of Search ............................. 62/476;
165/62, 63; 415/89

[56] References Cited
UNITED STATES PATENTS
2,272,871  2/1942  McGrath ................. 165/62 X
3,177,930  4/1965  Anderson, Jr. ............. 165/62
3,296,814  1/1967  Lynch et al. .............. 62/476 X
3,418,825  12/1968  Russell ..................... 62/476 X Primary Examiner—William F. O'Dea
Assistant Examiner—P. D. Ferguson
Attorneys—Harry G. Martin, Jr. and J. Raymond Curtin ABSTRACT: An absorption refrigeration system having a cooling and a heating mode of operation. A generator, an air-cooled condenser, a two-stage air-cooled absorber, a two-stage adiabatic evaporator and an air-conditioning heat exchanger are connected to provide cooling. A heating mode of operation is provided wherein absorbent solution is heated in the generator and passed through the heat exchanger back to the generator to supply heat to a space being conditioned. The system embodies a plural trough solution scoop pump and a plural trough refrigerant or chilled water scoop pump mounted on a single shaft and driven by a single reversible motor to effect a change from cooling to heating and return.

FIG. I

INVENTOR.
LOUIS H. LEONARD, JR.
BY
Frank M. Decker Jr.
ATTORNEY

3,608,628

HEATING AND COOLING SYSTEM

BACKGROUND OF THE INVENTION

This invention relates to absorption systems which are capable of providing either refrigeration or heating. It is known to employ centrifugal pumps to pump strong absorbent solution to the absorber, weak absorbent solution to the generator, and refrigerant to the evaporator. Centrifugal pumps require that a positive head exist in order to force the liquid into the impeller eye without flashing and vapor binding and this head requirement adds complexity and height to the absorption machine and limits the application thereto of centrifugal pumps.

A heating and cooling absorption system has been proposed which utilizes one or more control valves, generally of the hermetic motorized or solenoid type, to divert both the refrigerant and absorbent solution into the generator where the mixture is heated and passed to a suitable heat exchanger, when heating is desired. Such valves are relatively expensive and not totally reliable, and accordingly, it would be desirable if this type valve could be completely eliminated from the system.

SUMMARY OF THE INVENTION

An absorption machine is provided having a cooling cycle comprising a generator, a condenser, an absorber, an evaporator, and a heat-absorbing heat exchanger. The refrigerant is cooled in the evaporator and passed in heat exchange relation with the region to be cooled by means of the heat-absorbing heat exchanger. On the heating mode of operation, the passage of fluid through the system is rearranged so that the absorbent solution is mixed with the refrigerant and heated in the generator. The heated mixture is circulated through a suitable heat rejecting heat exchanger to provide heat to a desired region and is returned to the generator for reheating. Preferably, the heat-absorbing heat exchanger of the cooling mode is the same as the heat rejecting heat exchanger of the heating mode.

In accordance with this invention, there is also provided in the absorption refrigeration system, fluid transfer apparatus for circulating absorbent solution and refrigerant through the system. The fluid transfer apparatus desirably takes the form of one or more hermetic housings enclosing a solution scoop pump and a refrigerant scoop pump, the troughs being supported for rotation on a shaft driven by a reversible type motor. Driving the troughs of the scoop pumps in one direction causes solution and refrigerant to circulate through the system on the cooling cycle, and by simply reversing the motor, the system is automatically changed over to the heating cycle with the troughs rotating in the reverse direction. In this manner, the use of centrifugal pumps and control valves for switching between cooling and heating operation are avoided.

DESCRIPTION OF THE PREFERRED EMBODIMENT

Figure 1:
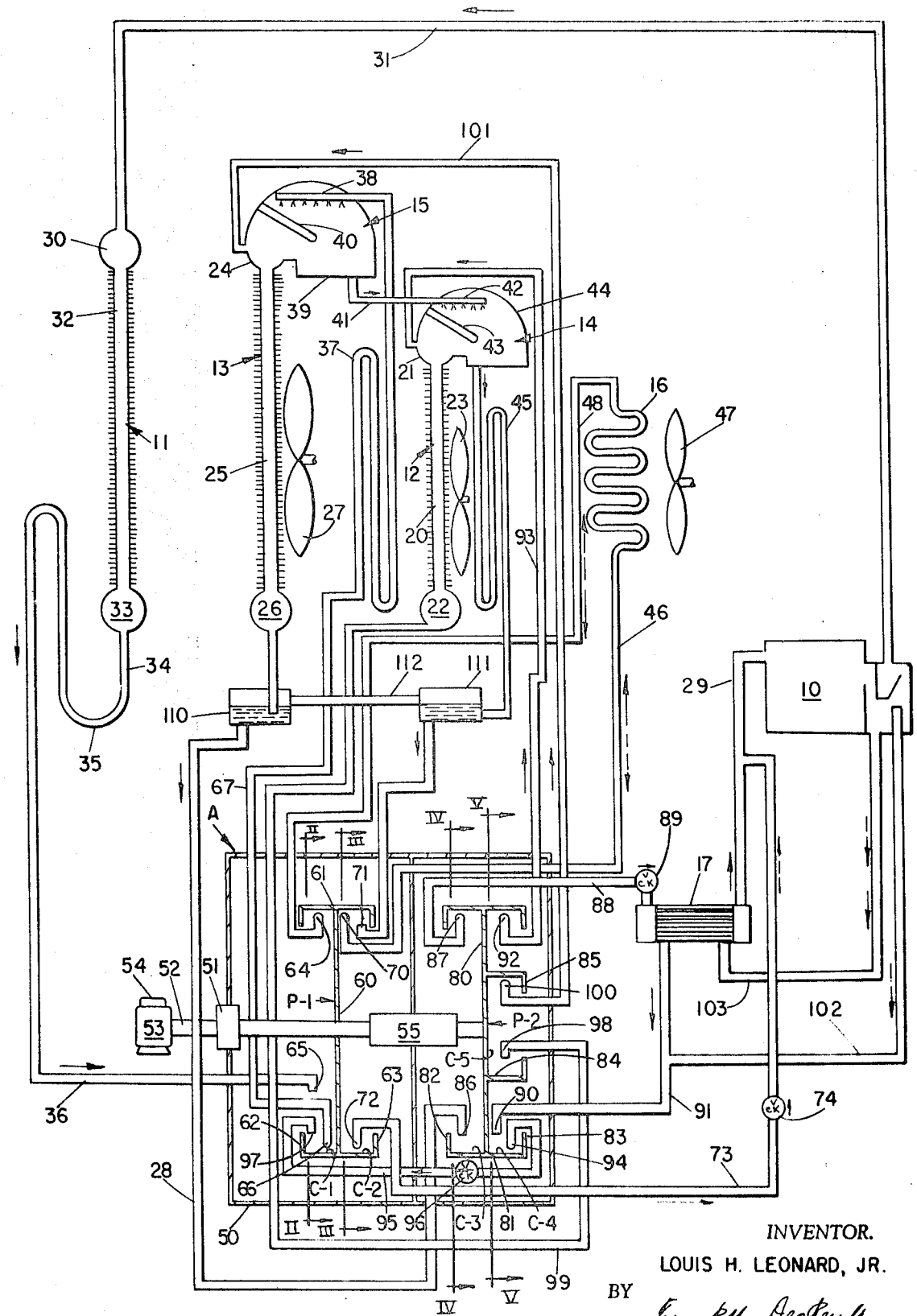
FIG. 1 is a schematic flow diagram, partially in cross section, of a heating and cooling system in accordance with this invention.

This invention will be described with respect to a preferred embodiment wherein a two-stage adiabatic refrigerant evaporator and a two-stage air-cooled absorber are employed in the cooling mode of operation. However, this invention may be employed in systems having any number of either adiabatic or nonadiabatic evaporator stages.

The preferred refrigerant is water and the preferred absorbent is an aqueous solution of lithium bromide, although other absorbent-refrigerant combinations, especially those including a lithium halide salt, may be employed instead. As used herein, a concentrated solution of lithium bromide which is strong in absorbing power will be referred to as "strong solution." "Weak solution" is a dilute solution of lithium bromide which is weak in absorbing power. A suitable compound, such as octyl alcohol (2-ethyl-n-hexanol) may be added to the solution for heat transfer promotion and corrosion inhibitors may be used if desired.

Referring to the drawings, the system comprises a generator 10, a condenser 11, a low-pressure absorber 12, a high-pressure absorber 13, a low-temperature adiabatic evaporator 14, a high-temperature adiabatic evaporator 15, an air-conditioning heat exchanger 16, a solution heat exchanger 17, and fluid transfer apparatus generally designated by the legend A. Heat exchanger 16 provides sensible heat exchange between cold liquid refrigerant and air being conditioned when the system is connected to provide refrigeration and therefore functions as a heat absorbing heat exchanger. If a nonadiabatic conventional evaporator is employed, heat exchanger 16 may be located in the evaporator.

Generator 10 may be of the known shell-and-tube type heated by a fuel burner, or in the alternative, may utilize steam or hot water as the heating fluid. Weak solution is supplied to generator 10 and boiled therein to concentrate the solution in the cooling mode of operation, the pumping being done by fluid transfer apparatus A.

Low-pressure absorber 12 comprises a plurality of vertically disposed finned absorber heat exchange tubes 20 connected at their upper ends by a low-pressure vapor header 21 and at their lower ends by a low-pressure liquid header 22. Strong solution overflows the open upper ends of absorber tubes 20 and passes downwardly along the inner surfaces of the absorber tubes while absorbing refrigerant vapor therein. The heat of the absorption process is rejected to ambient air passed over the exterior surfaces of absorber tubes by fan 23. The absorbent solution is somewhat diluted by absorption of refrigerant vapor in tubes 20, so that the solution collected in low-pressure liquid header is of intermediate concentration and drains therefrom into fluid transfer apparatus A and is pumped to high-pressure vapor header 24 of high-pressure absorber 13.

High-pressure absorber 13 comprises a plurality of finned vertical absorber heat exchange tubes 25 joined at the upper ends by header 24 and at their lower ends by high-pressure liquid header 26. Intermediate absorbent solution overflows the upper open ends of absorber tubes 25 and passes downwardly along the interior surfaces of the absorber tubes while refrigerant vapor is being absorbed therein. The heat of the absorption process is rejected from high-pressure absorber 13 to ambient air passed over the exterior surfaces of absorber tubes 25 by fan 27.

Absorbent solution passing downwardly through absorber tubes 25 is further diluted by the absorption of refrigerant vapor therein so that the absorbent solution collected in high pressure liquid header 26 is weak in absorption power. The weak solution passes from liquid header 26 through drain conduit 28 into fluid transfer apparatus A from which it is pumped through the interior of the tubes of solution heat exchanger 17 and through weak solution passage 29 into generator 10 for reconcentration therein.

Refrigerant vapor is formed in generator 10 by the boiling of absorbent solution. This refrigerant vapor passes from generator 10 to refrigerant vapor header 30 of condenser 11 through refrigerant vapor conduit 31. Refrigerant condenser 11 comprises a plurality of vertically disposed finned tubes 32 connected at their upper ends by vapor header 30 and at their lower ends by refrigerant condensate header 33. Preferably, condenser 11 is located to receive air passing over the tubes in absorber 13 in order to utilize the absorber fans for passage of cooling air over the condenser. The refrigerant condensate formed in condenser 11 passes from header 33 through condensate passage 34 having a downwardly extending loop or trap 35 connected thereto and through condensate conduit 36 to fluid transfer apparatus A to be pumped therefrom through isolation loop 37 to high-temperature adiabatic evaporator 15 through spray header 38 therein.

High-temperature adiabatic evaporator 15 preferably comprises a shell 39 mounting therein a baffle member 40 for directing the vapor droplets discharged from spray header 38 into conduit 41 communicating with low temperature adiabatic evaporator 14. A small quantity of refrigerant is evaporated from refrigerant passing through high temperature evaporator, thereby flash-cooling the remaining refrigerant. The cooled refrigerant passes from high temperature evaporator 15 to low temperature evaporator 14 through refrigerant passage 41 which has connected thereto spray header 42 for discharging liquid refrigerant against baffle member 43 disposed within shell 44 of low-temperature evaporator 14. Within evaporator shell 44 a further small quantity of refrigerant is evaporated which results in flash-cooling the remainder of refrigerant passing therethrough to a still lower temperature. In all, only about one per cent of the total refrigerant flowing through adiabatic evaporators 14 and 15 need be evaporated to satisfactorily flash-cool the remaining 99 percent. It is preferred to employ adiabatic evaporators in which the refrigerant is flash-cooled and no external heat is added; however, conventional single or multistage evaporators having heat absorbing heat exchangers therein may be employed, if desired.

The cold refrigerant then passes from low-temperature evaporator 14 through an isolation loop 45 and drains into fluid transfer apparatus A from which it is pumped through conduit means 46 up through heat absorbing heat exchanger 16 having in association therewith fan means 47 for passing air to be conditioned over the heat exchanger. Heat exchanger 16 passes cold liquid refrigerant in heat exchange relation with the air passing thereover to cool the air which constitutes a refrigeration load in the cooling mode of operation. After absorbing heat from the air being cooled, the warmed liquid refrigerant drains down through conduit means 48 connected to heat exchanger 16 and into fluid transfer apparatus A from which it is pumped through isolation loop 37 back to the high temperature evaporator.

Prior to describing the heating mode of operation, the fluid transfer apparatus A will be described. The apparatus A may comprise a hermetic housing 50 mounting hermetic magnetic drive means 51 connected at one end by shaft means 52 to a single reversible motor 53 equipped with either a manual or automatic switching means 54. The shaft means 52 at the opposite end of the magnetic drive means 51 is journaled in solution lubricated radial and thrust bearing means 55 and supports on opposite sides of the bearing means a double-trough chilled water scoop pump P-1 and a triple-trough solution scoop pump P-2.

The pump P-1 includes a central partition member 60 supported by the drive shaft 52, the partition having connected thereto along its circumference an annular wall member 61 having radially inwardly directed wall portions 62 and 63 to define with the partition member 60 a pair of refrigerant circulation chambers C-1 and C-2. Leading into chamber C-1 is inlet passage portion 64 forming a part of conduit 48 connected to air-conditioning heat exchanger 16. Passage 64 functions as a drain line when the system is on the cooling mode of operation and as a pump inlet passage when the system is on the heating cycle. An inlet orifice 65 of conduit 36 passes refrigerant from the condenser header 33 to chamber C-1. Eduction orifice 66 of conduit 67 passes liquid refrigerant from chamber C-1 to high-temperature evaporator 15 through circulation loop 37.

Chamber C-2 has therein a passage 70 forming a part of conduit means 46 leading to air conditioning heat exchanger 16 and which conduit portion performs a dual function. Passage 70 carries cool refrigerant pumped to the heat exchanger 16 when the system is on the cooling mode of operation and performs a drain function when on the heating cycle. Also in chamber C-2 is conduit portion 71 leading through sump 111 and circulation loop 45 to low temperature evaporator 14 to drain cold liquid refrigerant into this chamber. There is also in chamber C-2 conduit portion or eduction orifice 72 of conduit means 73 for transferring refrigerant through check valve means 74 to the generator 10 when the system is providing heating.

Scoop pump P-2 comprises a central partition member 80 secured to drive shaft 52 and mounting along its circumference an annular wall member 81 provided with radially inwardly directed wall portions 82 and 83 to define a pair of solution circulation chambers C-3 and C-4. Also attached to the partition member 80 is an annular wall member 84 circumferentially inwardly spaced from wall member 81 and having attached thereto a radially inwardly extending annular wall portion 85 defining with partition 80 and wall member 84 a solution circulation chamber C-5.

Solution circulation chamber C-3 has leading thereto conduit portion 86 of conduit means 28 for transferring into this chamber weak solution draining from high pressure liquid header 26 of high pressure absorber 13. The weak solution is pumped from chamber C-3 by scoop 87 of conduit means 88 and passed through check valve 89, solution heat exchanger 17 and weak solution passage 29 into generator 10 for reconcentration therein.

Solution circulation chamber C-4 has three conduit portions leading thereto. The first conduit 90 is a double function drain line forming a part of conduit means 91 communicating with solution heat exchanger 17 and conveying strong solution from generator 10 to chamber C-4, from which it is pumped by eduction orifice 92 of conduit means 93 and transferred thereby to low-pressure absorber 12. The dual function line 90 drains solution into chamber C-4 on both the cooling and heating modes of operation. On the heating cycle solution is also pumped from chamber C-4 by eduction orifice 94 of conduit means 95 and transferred through check valve 96 and drain conduit portion 97 into chamber C-1 from which it is pumped to air-conditioning heat exchanger 16 by means of eduction orifice 64 of conduit means 48. The conduit means 95 and associated eduction orifice 94 and drain conduit portion 97 and inactive when the system is on the cooling cycle as will be subsequently explained.

Solution circulation chamber C-5 has leading thereto drain conduit portion 98 of conduit means 99 communicating with low pressure liquid header 22 of low pressure absorber 12 for transferring to chamber C-5 intermediate solution which is pumped therefrom by eduction orifice 100 of conduit means 101 and passed to high pressure absorber 13.

Generator 10 has connected thereto a solution bypass conduit 102 through which approximately eighty percent of the solution flows to conduit 91 when the system is on the heating mode of operation, the remaining solution on the heating cycle passing through conduit 103 which passes all of the fluid when the system is on the cooling mode of operation.

Figures 2, 3:
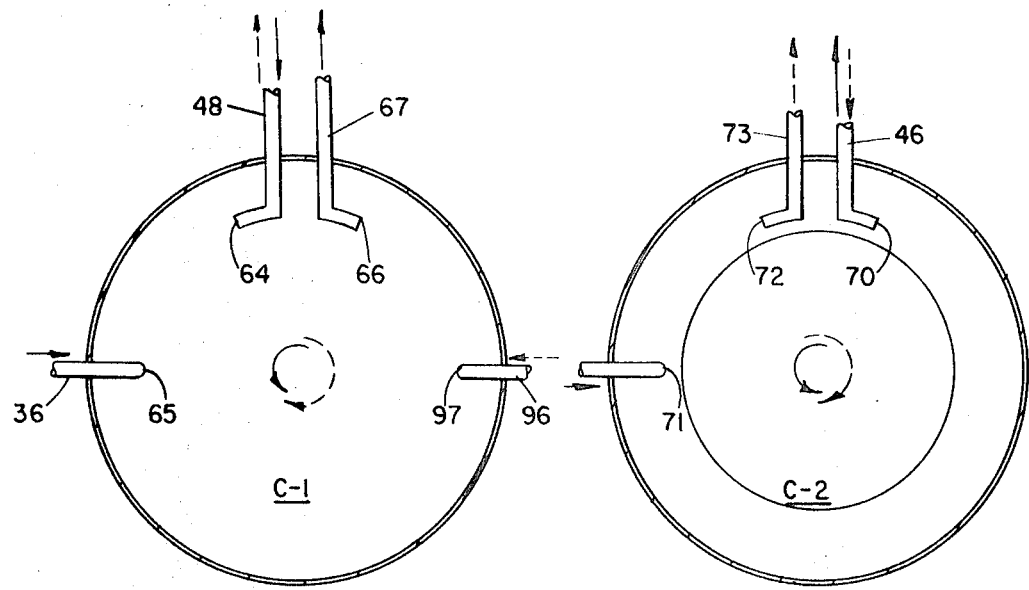
FIG. 2 is a cross section through a heating and cooling system taken substantially along line II—II of FIG. 1.
FIG. 3 is a cross section through a heating and cooling system taken substantially along line III—III of FIG. 1.

As will be seen from FIG. 2, eduction orifice 64 of passage 48 faces in a counterclockwise direction in chamber C-1 and eduction orifice 66 of passage 67 faces in clockwise direction in the chamber. Consequently, rotation of the scoop pump pan in a counterclockwise direction causes liquid to be impelled into eduction orifice 66 while orifice 64 merely trails in the wake of the preceding scoop. Similarly, when the scoop pump is rotated in a clockwise direction, eduction orifice 66 merely trails in the wake of the passage 48 containing eduction orifice 64 into which liquid is impelled. In FIG. 3, eduction orifices 70 and 72 face in a counterclockwise and clockwise direction respectively and are consequently only operative in the correspondingly opposite direction of rotation of pan or chamber C-2 which is axially spaced from pan or chamber C-1.

Figure 4:
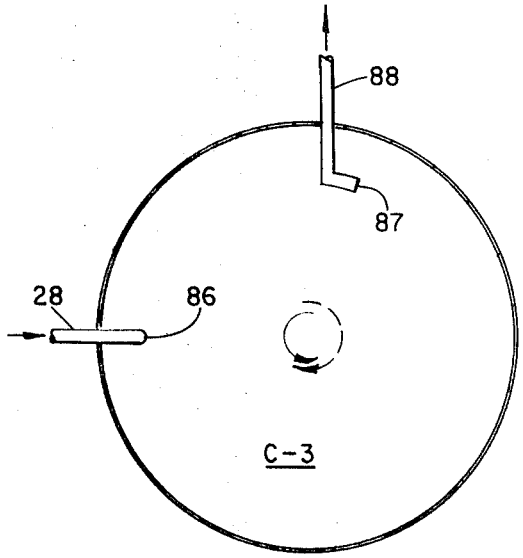
FIG. 4 is a cross section through a heating and cooling system taken substantially along line IV—IV of FIG. 1.

As shown in FIG. 4, solution chamber C-3 is arranged with eduction orifice 87 facing in a clockwise direction in order that counterclockwise rotation of the pan causes liquid to be impelled into the chamber, whereas the opposite rotation does not result in pumping.

Figure 5:
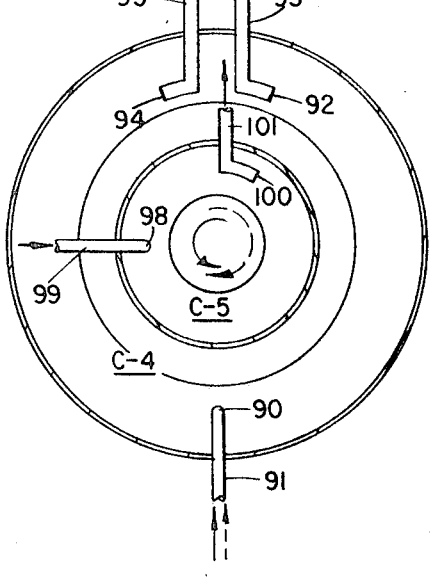
FIG. 5 is a cross section through a heating and cooling system taken substantially along line V—V of FIG. 1.

FIG. 5 illustrates a cross section through the concentric pans forming scoop pumps C-4 and C-5. Eduction orifices 92 and 94 face in a clockwise and a counterclockwise direction respectively, to receive liquid therein only when the pan is rotated in a correspondingly opposite direction. In both instances, liquid is supplied by drain line 91 through orifice 90 which is preferably disposed approximately 180° removed from scoops 92 and 94 to provide a maximum resistance time for the liquid in the pan so that it will be accelerated to a relatively high velocity before reaching the scoop. Intermediate solution chamber C-5 contains only a clockwise facing eduction orifice 100 operative only on counterclockwise rotation of the pan to receive liquid. It is preferred to locate inlet orifice 98 of passage 99 greater than 180° from the eduction orifice to permit for acceleration of the liquid to its maximum velocity before being received by the scoop.

During cooling operation of the absorption system, motor 53 is rotated in a counterclockwise direction causing scoops 66, 70, 87, 92 and 100 to be operative while scoops of eduction orifices 64, 72 and 94 do not pump liquid but trail in the wake of the preceding scoop. With motor 53 rotating in a counterclockwise direction, strong solution drains from generator 10 through passage 103, heat exchanger 17 and strong solution passage 91 into strong solution chamber C-4. The strong solution is picked up by eduction orifice 92 and pumped through passage 93 to vapor header 21 of low pressure absorber stage 12. The strong solution passes downwardly through the absorber tubes 20, absorbing refrigerant vapor, which dilutes the strong solution. The intermediate strength solution is collected in liquid header 22. The intermediate solution passes through solution passage 99 and drains through inlet orifice 98 into chamber C-5. The rotation of scoop pump pan forming chamber C-5 causes the intermediate solution to be picked up by eduction orifice 100 and pumped through passage 101 to vapor header 84 of high-pressure absorber stage 13. The absorbent solution passes downwardly through absorber tubes 25 and is further diluted by absorption of refrigerant vapor. Weak solution is collected in liquid header 26 and passes through weak solution passage 28 from which it drains through orifice 86 into weak solution chamber C-3. The weak solution is picked up by eduction orifice 87 and pumped through weak solution passage 88, heat exchanger 17, and weak solution passage 29 to generator 10 for reconcentration therein.

The refrigerant vapor formed by generator 10 passes through vapor passage 31 to condenser 11 where it is condensed by heat exchange with ambient air. The refrigerant condensate is collected in condensate header 33, passes through passage 34, isolation loop 35 and condensate passage 36 from which it drains into chamber C-1 through orifice 65. Rotation of the pan-forming chamber C-1 in the counterclockwise direction causes the liquid refrigerant to be pickup up by scoop 66 and passed through passage 67, isolation loop 37 and spray header 38 into high-temperature evaporator 15. The refrigerant is flash-cooled in the high-temperature evaporator and the cool remaining liquid drains through passage 41 and spray header 42 into low-temperature evaporator 14. The liquid refrigerant is further flash-cooled in the low-temperature evaporator and the cold remaining refrigerant passes therefrom through loop 45 into sump 111. The cold refrigerant drains from sump 111 through drain orifice 71 into chamber C-2. The cold liquid is picked up by eduction orifice 70.

In accordance with this invention, the system is switched from cooling to heating mode operation by simply reversing the direction of motor 53 so that it rotates in a clockwise direction. When the scoop pump pans rotate in a clockwise direction, scoops 64, 72 and 94 are operative to pump liquid, and scoops 66, 70, 87, 92 and 100 do not have liquid impelled into them. Warm solution from generator 10 continues to pass through passage 103, heat exchanger 17, and passage 91 from which it drains through orifice 90 into solution chamber C-4. The hot solution is then picked up by orifice 94 and passed through passage 95 and transferred through check valve 96 to chamber C-1 into which it drains from orifice 97. The hot solution discharged into chamber C-1 is picked up by orifice 64 and passes through passage 48 into air-conditioning heat exchanger 16 to provide heating to the desired location. The solution is then returned through passage 46 having orifice 70 therein to chamber C-2. This solution is impelled into orifice 72 of passage 73 through which it is pumped past check valve 74 into generator 10 for reheating.

It will be noted that the hot solution is substantially diluted by having been mixed with refrigerant in its passage through chambers C-1 and C-2, so that it forms a solution having a relatively low freezing point. In addition, the volume of solution being circulated to the generator is increased by being mixed with the refrigerant in the system so that the level in the generator will rise and overflow the top of passage 102. Thus, hot solution will continue to be supplied from the generator into chamber C-4 through both passages 103 and 102 while the system is operating in the heating mode.

When it is desired to return the system from the heating mode to the cooling mode of operation, the direction of motor 53 is again reversed, so as to drive the scoop pump pans in a counterclockwise direction. While the direction of liquid flow in the system will be the same as previously described for cooling operation, it will be apparent that the mixture of refrigerant and absorbent solution must be separated to provide full cooling capacity. This is achieved by providing a refrigerant sump 111 in refrigerant passage 45 and an absorbent sump 110 in solution passage 28 with an overflow passage 112 extending between the two sumps. As long as the volume of refrigerant evaporated is low, due to having substantial absorbent mixed therein, the level of refrigerant in sump 111 will be relatively high. Consequently, liquid will drain from sump 111 through passage 112 into sump 110 from which it will pass through chamber C-5 to generator 10 where refrigerant will be separated therefrom. The bleeding of refrigerant to the generator through passage 112 will continue until the refrigerant has become sufficiently purified to sustain the refrigeration load on the system, thereby providing the desired refrigeration capacity.

The invention described herein utilizes the unique and special properties of a scoop pump to effectively pump liquid in an absorption refrigeration system in the absence of a suction head and in the presence of noncondensable gases or other vapors without injurious effect to the pump. Furthermore, by utilizing scoops or eduction orifices facing different directions in the pump, it is possible to switch the fluid flows in the system to provide either heating or cooling without the use of expensive reversing valves by simply reversing the direction of rotation of the scoop pump pans. Accordingly, there is provided an improved absorption system and a scoop pump capable of operating as both a pump and a valve for supplying liquid to one or more selectable locations depending on the direction of rotation of the pump.

While preferred embodiments of this invention have been described for purposes of illustration, it will be appreciated that the invention may be otherwise embodied within the scope of the following claims.

I claim:

1. A heating and cooling system having a heating mode of operation and a cooling mode of operation;
   A. said system in the cooling mode of operation comprising a generator for boiling absorbent solution to concentrate said solution; a condenser for condensing refrigerant vapor formed in said generator; an evaporator for evaporating refrigerant condensed in said condenser to provide cooling; an absorber for absorbing refrigerant vapor concentrated in said evaporator into absorbent solution formed in said generator;

B. said system in the heating mode of operation comprising means including said generator for heating absorbent solution; means including a heat rejecting heat exchanger for passing heated absorbent solution in heat exchange relation with a heating load to provide heating; passage means for passing heated liquid absorbent solution from the generator to said heat-rejecting heat exchanger for heating said heating load, thereby cooling said liquid absorbent solution; and passage means for passing cooled liquid absorbent solution from the heat-rejecting heat exchanger to the generator for reheating therein; and C. scoop pump means for pumping liquid through passages in said system and for switching the system between heating and cooling mode operation; said scoop pump comprising a housing, a rotatable pan within said housing, a motor including reversing means connected for driving said rotatable pan, a first scoop disposed in said pan and having an eduction orifice facing in one direction and connected to conduit means for passing liquid to a location in said system to which it is desired to pass liquid only during the cooling mode of operation of said system, means to pass a liquid in said system into said pan, and means to control the direction of rotation of said pan to render said scoop operative in a first direction of rotation and inoperative upon a second direction of rotation of said pan to pump liquid from said pan to said location, depending on the desired mode of operation of said system.

2. A heating and cooling system as defined in claim 1 including a second scoop disposed in said pan and having an eduction orifice facing in the opposite direction from the first scoop, and connected to conduit means for passing a liquid to another location in said system to which it is desired to pass liquid only during the heating mode of operation of said system, whereby reversing rotation of said motor to rotate said pan in the second direction of rotation renders said second scoop operative to pump liquid to said other location in the system and renders said first scoop inoperative to pump liquid from said pan.

3. A heating and cooling system as defined in claim 2 wherein one of said scoops is connected to a location in said system for draining liquid into said pan when the pan is rotated in a direction to render said one scoop inoperative to pump liquid, whereby said one scoop performs a pumping function in one mode of operation of said system and a supplying function in the other mode of operation of the system.

4. A heating and cooling system as defined in claim 1 wherein said scoop pump includes a first pan and a second pan, said first pan having inlet means for supplying refrigerant cooled in the evaporator thereto, said first scoop being connected with conduit means for circulating cooled liquid refrigerant between the evaporator and the heat exchanger when said system is operating in the cooling mode and said pan is rotated in said first direction; said second pan having a first scoop disposed therein with an eduction orifice facing in said one direction and connected with conduit means for circulating absorbent solution between said absorber and said generator when said system is operating in the cooling mode; said first pan having a second scoop therein with an eduction orifice facing in a second direction for passing refrigerant to said generator for heating therein when said system is operating in the heating mode.

5. A heating and cooling system as defined in claim 4 wherein said second scoop in said second pan is connected with passage means for pumping liquid through the heat-rejecting heat exchanger to the generator, and wherein said second scoop pump pan includes a second scoop facing in said second direction for passing heated liquid from the generator to said first scoop pump pan for passage therefrom to the heat-rejecting heat exchanger when said system is operating in the heating mode.